US009589408B2

(12) United States Patent
Chang et al.

(10) Patent No.: US 9,589,408 B2
(45) Date of Patent: Mar. 7, 2017

(54) SHEET TYPE MEDIUM THICKNESS IDENTIFICATION DEVICE AND IDENTIFICATION METHOD THEREOF

(71) Applicant: GRG Banking Equipment Co., Ltd., Guangzhou, Guangdong (CN)

(72) Inventors: Yang Chang, Guangdong (CN); Guang Chen, Guangdong (CN); Dong Tan, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/650,917

(22) PCT Filed: Jul. 2, 2013

(86) PCT No.: PCT/CN2013/078628
§ 371 (c)(1),
(2) Date: Jun. 10, 2015

(87) PCT Pub. No.: WO2014/101381
PCT Pub. Date: Jul. 3, 2014

(65) Prior Publication Data
US 2016/0203666 A1    Jul. 14, 2016

(30) Foreign Application Priority Data

Dec. 24, 2012 (CN) .......................... 2012 1 0571601

(51) Int. Cl.
G07D 7/164 (2016.01)
G07D 7/16 (2016.01)
G01B 5/06 (2006.01)

(52) U.S. Cl.
CPC ............. *G07D 7/164* (2013.01); *G01B 5/068* (2013.01)

(58) Field of Classification Search
CPC .......... G07D 7/164; G01B 5/068; B65H 3/02; B65H 3/04; B65H 3/06; B65H 7/00; B65H 7/02; B65H 7/14
See application file for complete search history.

(56) References Cited

FOREIGN PATENT DOCUMENTS

CN        201081689 Y     7/2008
CN        101996433 A     3/2011
(Continued)

OTHER PUBLICATIONS

Xue et al., WO 2010/139205 A1, English Translate, Dec. 9, 2010, 9 pp.*

(Continued)

*Primary Examiner* — Toan Le
(74) *Attorney, Agent, or Firm* — Wolf, Greenfield & Sacks, P.C.

(57)    ABSTRACT

A device for identifying thickness of a sheet-like medium and method thereof are provided. The device includes: a frame, a thickness shaft, a floating shaft and a sensor; where: both ends of the thickness shaft are arranged on the two lateral plates of the frame via bearings; both ends of the floating shaft are arranged on the two lateral plates of the frame via bearings and an outer surface of the floating shaft is tangently contacted with an outer surface of the thickness shaft; and the sensor is arranged on the facade of the frame, and configured to detect an amplitude of a point of tangency where the floating shaft is tangent to the thickness shaft.

11 Claims, 6 Drawing Sheets

(56) References Cited

FOREIGN PATENT DOCUMENTS

| | | |
|---|---|---|
| CN | 103106729 A | 5/2013 |
| DE | 102004030618 A1 | 1/2006 |
| EP | 0241513 B2 | 3/1994 |
| WO | WO 87/02018 | 4/1987 |
| WO | WO 2010139205 A1 * | 12/2010 ............. B65H 3/063 |

OTHER PUBLICATIONS

International Search Report dated Sep. 12, 2013 from corresponding International Application No. PCT/CN2013/078628.
Written Opinion of the International Searching Authority, date Jul. 2, 2013, from corresponding International Application No. PCT/CN2013/078628.
European Search Report, dated Nov. 5, 2015, from corresponding European Application No. 13867896.6.

* cited by examiner

SHEET TYPE MEDIUM THICKNESS IDENTIFICATION DEVICE AND IDENTIFICATION METHOD THEREOF

This application is the national phase of International Application No. PCT/CN2013/078628, filed on Jul. 2, 2013, which claims the priority benefit of Chinese Patent Application No. 201210571601.9 titled "DEVICE FOR IDENTIFYING THICKNESS OF SHEET-LIKE MEDIUM AND METHOD THEREOF", filed with the Chinese State Intellectual Property Office on Dec. 24, 2012, which applications are hereby incorporated by reference to the maximum extent allowable by law.

TECHNICAL FIELD

The present application relates to a device for identifying thickness of a sheet-like valuable and identification method thereof for identifying thickness of sheet-like valuable paper in financial self-service equipment.

BACKGROUND

Banknote thickness identification is an important detection method in the process of banknote negotiability identifying in the field of existing financial self-service equipment. At present commonly used mechanical contact identification method for valuable paper is mainly implemented through relative rotation of a driving part and a driven part, where the driving part is a thickness driving shaft and the driven part includes a shaft and a floating part arranged on the shaft, with surface of the floating part tangently contacting with the thickness driving shaft under the action of external pressure and can float up and down with variation of banknote thickness, therefore thickness of the banknote can be detected.

However, surfaces of the thickness driving shaft and the driven shaft are very smooth due to the requirement of machining precision of the mechanical contact valuable paper thickness identification device meanwhile the driving device drives the driven device to rotate, therefore slip occurs during the rotation process, making a same point of the thickness driving shaft tangent with arbitrary point on the surface of the driven shaft, output phase having no regularity and no periodical variation, resulting in an inaccurate thickness detecting result. In addition, slip between the thickness driving shaft and the driven shaft makes sliding friction occur to surface of the shaft during the rotation process, which accelerates abrasion of shaft surface and degrades the accuracy, consequently, a same detected object with a uniform thickness is measured to have inconsistent results in different time quantum, that is to say, slip problem brings error to valuable paper thickness detection, degrades thickness detecting accuracy and adversely affects detection rate of the financial equipment.

SUMMARY

For improving measurement accuracy of a mechanical contact thickness identification device for sheet-like medium, a sheet-like medium thickness identification device and identification method thereof is provided to prevent driving shaft and driven shaft from slipping according to the present application.

The sheet-like medium thickness identification device includes: a frame, including two lateral plates and a facade, configured to carry a thickness shaft, a floating shaft and a sensor; where both ends of the thickness shaft are arranged on the two lateral plates of the frame via bearings; both ends of the floating shaft are arranged on the two lateral plates of the frame via bearings and an outer surface of the floating shaft is tangently contacted with an outer surface of the thickness shaft; and the sensor is arranged on the facade of the frame, and configured to detect an amplitude of a point of tangency where the floating shaft is tangent to the thickness shaft; where one end of the thickness shaft is fixedly connected with a first synchronous pulley, the first synchronous pulley is connected with a first synchronous pulley gear via a first synchronous belt; one end of the floating shaft is fixedly connected with a second synchronous pulley, the second synchronous is connected with a second synchronous pulley gear via a second synchronous belt; the first synchronous pulley gear meshes with the second synchronous pulley gear and is assembled on a shaft of a driving motor.

Specifically, the first synchronous pulley gear includes a synchronous pulley part and a gear part, and the first synchronous belt sleeves on the first synchronous pulley and the synchronous pulley part of the first synchronous pulley gear.

Furthermore, the second synchronous pulley gear includes a synchronous pulley part and a gear part, the second synchronous belt sleeves on the second synchronous pulley and the synchronous pulley part of the second synchronous pulley gear, and the gear part of the second synchronous pulley gear meshed with the gear part of the first synchronous pulley gear.

Specifically, the second synchronous pulley gear sleeves on a bearing, the bearing sleeves on a shaft which riveted with the lateral plate of the frame, and second synchronous pulley gear is rotatable with the shaft.

Specifically, one end of the thickness shaft and the first synchronous pulley gear are fixed via a D-shape structure, and one end of the floating shaft and the second synchronous pulley gear are fixed via a D-shape structure.

Preferably, the floating shaft includes an axis, an elastic material layer and an outer wheel shell layer from the inside to the outside, and the outer surface of the outer wheel shell layer is tangent to the outer surface of the thickness shaft.

Preferably, the elastic material layer includes at least three foil slices, one end of each elastic foil slice is fixed to the axis, the other end is fixed to the inner wall of the outer wheel shell layer, and the three elastic foil slices are distributed in a vortex shape.

An identification method for the sheet-like medium includes step 01 to step 06. step 01 includes: calibrating benchmark data $Vm0$; step 02 includes: calibrating standard thickness data $Hstd$ of the sheet-like medium; step 03 includes: collecting, by a sensor, signal data $Vm2$ when the sheet-like medium passes; step 04 includes: calculating $Vr$; where the collected signal data $Vm2$ is revised to obtain $Vm2re(t)$ by deducing the benchmark data $Vm0$ according to a formula of $Vm2re(t)=Vm2(t)-Vm0(t)$, then $Vr$ is calculated according to a formula of $Vr(t)=Vm2re(t)-Hstd+\Delta Th2$, where $\Delta Th2$ is a threshold value set based on a characteristic of a device for detecting thickness of sheet-like medium; step 05 includes: counting the number of data $Vrplus$ which is greater than zero in data $Vr$; and step 06 includes: determining whether $Vrplus$ is greater than a threshold $Th3$ set based on the characteristic of the device, the thickness of the sheet-like medium is abnormal if $Vrplus$ is greater than the threshold $Th3$, the thickness of the sheet-like medium is normal if $Vrplus$ is not greater than the threshold $Th3$.

Specifically, the step 01 further includes step 011 to step 013. Step 011 includes: collecting, by the sensor, the benchmark data Vm0 when there is no medium passing through; step 012 includes: performing smoothing filtering on the benchmark data Vm0; and step 013 includes: storing the signal benchmark data Vm0.

Specifically, the step 02 includes step 021 to step 024. Step 021 includes: collecting, by the sensor, signal data Vm1 when there is a normal sheet-like medium passes; step 022 includes: performing smoothing filtering on the signal date Vm1; step 023 includes: reading the signal benchmark data Vm0; and step 024 includes: calculating standard thickness of the sheet-like medium Hstd according to a formula of $$Hstd = \sum_{t=0}^{n} (Vm1(t) - Vm0(t))/n,$$

where n is a length of each collected data.

One end of the thickness shaft is fixedly connected with the first synchronous pulley, the first synchronous pulley is connected with the first synchronous pulley gear via the first synchronous belt. One end of the floating shaft is fixedly connected with the second synchronous pulley gear via the second synchronous belt. The first synchronous pulley gear meshes with the second synchronous pulley gear and is provided on the shaft of a driving motor. Therefore, the driving motor can drive the first synchronous pulley and the first synchronous pulley gear connected with the first synchronous pulley to rotate, thus the thickness shaft is driven to rotate. Besides, the first synchronous gear pulley gear drives the second synchronous gear pulley gear to rotate in a reverse direction as a result of the meshing of both, and the second synchronous gear pulley gear also drives the second synchronous pulley to rotate via the second synchronous belt thus bringing along the rotation of the floating shaft, hence one driving motor simultaneously drives the thickness shaft and floating shaft to rotate, the mode of the thickness shaft driving the floating shaft to rotate is fundamentally changed and slip between the thickness shaft and the floating shaft is effectively prevented.

In addition, a special conjunction manner between the elastic material layer and the outer wheel shell layer is adopted in the floating shaft, which make the outer wheel shell layer may rotate around the axes and to ensure that the outer wheel shell layer with high elasticity may float up and down with variation of thickness of the sheet-like media. That is to say, when a sheet-like medium enters or exits, the thickness of the sheet-like medium may be detected by only the displacement of the outer wheel shell layer, rather than the displacement of the whole shaft, and error may be reduced.

BRIEF DESCRIPTION OF THE DRAWINGS

The present application will now be described in further detail with the accompanying figures and embodiment.

DETAILED DESCRIPTION

For further elaborating a device for identifying thickness of a sheet-like medium according to the present disclosure, further and detailed introduction is made in conjunction with figures of a preferred embodiment of the present disclosure.

Figure 1:
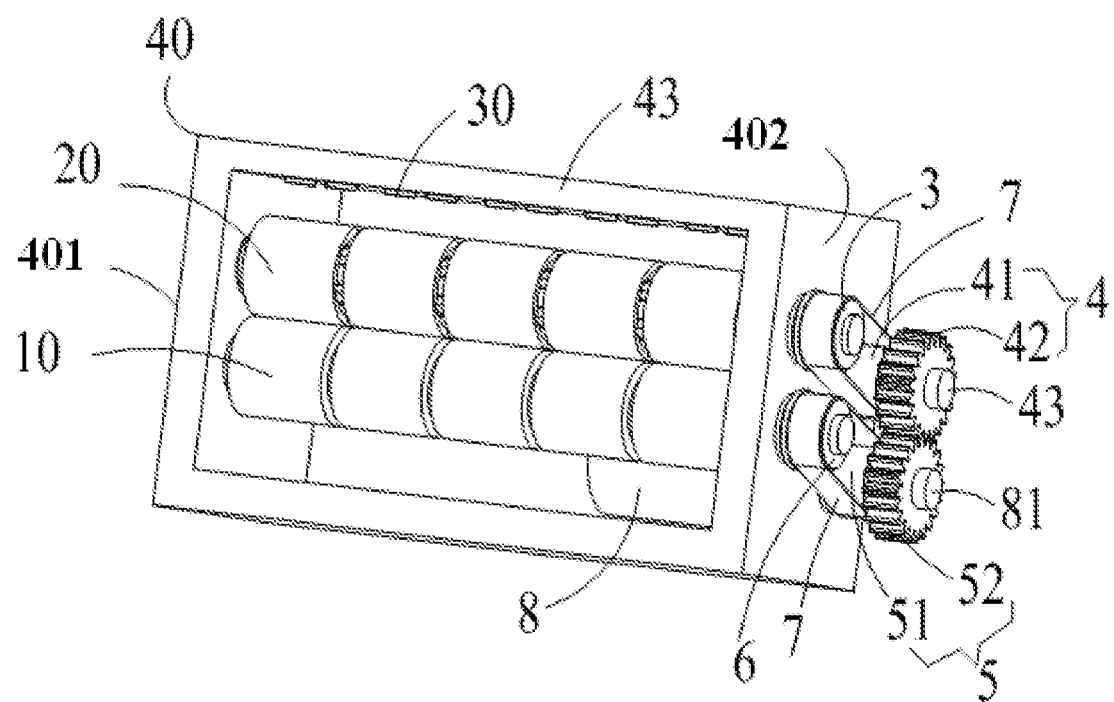
FIG. 1 is a schematic diagram of a device for identifying thickness of a sheet-like medium according to a preferred embodiment of the present application.
Figure 3:
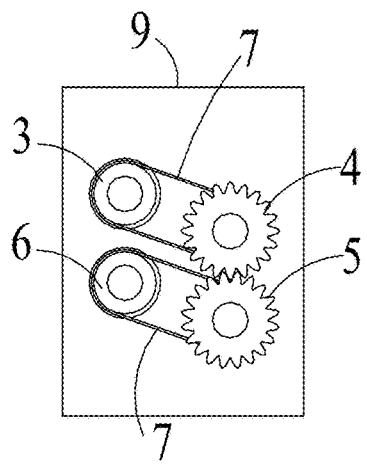
FIG. 3 is a schematic diagram of the right side of the device for identifying thickness of a sheet-like medium in FIG. 1.

Referring to FIG. 1, a device for identifying thickness of a sheet-like medium includes a frame 40, a thickness shaft 10, a floating shaft 20 and a sensor 30. The frame 40 includes two lateral plates 401 and 402 as well as a facade 43 and the sensor 30 is arranged on the facade 43 of the frame. Two ends of the floating shaft 20 and the thickness shaft 10 are truss on the two lateral plates 401, 402 of the frame 40, where the floating shaft 20 and the thickness shaft 10 are parallel with each other and the outer surfaces of both of which are tangent to each other. Combining with FIG. 3, the end of the thickness shaft 10 trussed on the lateral plate 402 is fixedly connected with a synchronous pulley 6, which is sleeved with a synchronous belt 7. The synchronous belt 7 is harnessed to a synchronous pulley part 51 of a synchronous pulley gear 5. A gear part 51 of the synchronous pulley gear meshes with a gear part 42 of another synchronous pulley gear 4. The synchronous pulley part 41 of the synchronous pulley gear 4 is sleeved with a synchronous belt 7, which is sleeved on a synchronous pulley 3, and the synchronous pulley 3 is fixedly connected with the end of the thickness shaft trussed on the lateral plate 402. Specifically, in the present embodiment, the end of the thickness shaft 10 trussed on the lateral plate 402 is formed into a D-shaped shaft, the corresponding synchronous pulley 6 is opened with a D-shaped groove, and the D-shaped shaft is coupled with the D-shaped groove, therefore the thickness shaft 10 is fixedly connected with the synchronous pulley 3 through the D-shaped shaft and the D-shaped groove. Similarly, the floating shaft 20 is fixedly connected with the synchronous pulley 3 through the same structure.

A driving motor 8 is fixedly arranged on the lateral plate 402 of the frame 40 and the synchronous pulley gear 5 is assembled to a shaft 81 of the driving motor, that is to say, the synchronous pulley gear 5 can rotate with the shaft 81 of the driving motor. In addition, the synchronous pulley 4 sleeves on a bearing and the bearing sleeves on a shaft 43 riveted on the lateral plate of the frame and the synchronous pulley gear can rotate around the shaft 43.

When the synchronous pulley gear 5 is rotates, the synchronous belt 7 drives the synchronous pulley 6 to rotate in the same direction as the synchronous pulley gear 5. The thickness shaft 10 is also driven to rotate in the same direction as a result of the fix connection between synchronous pulley 6 and the thickness shaft 10. In addition, since gear 52 of the synchronous pulley gear 5 meshes with the gear part 42 of the synchronous pulley gear 4, when the synchronous pulley gear 5 rotates, the synchronous pulley gear 5 drives the synchronous pulley gear 4 to rotate in the reversed direction as the synchronous pulley gear 5 the synchronous belt 3 rotates in the same direction as the synchronous pulley gear 4 under the driving of synchronous belt 7. The floating shaft 20 rotates in the same direction with synchronous pulley belt due to the fix connection between the synchronous pulley 3 and the floating shaft 20, thus the driving motor 8 can simultaneously drive the thickness shaft 10 and the floating shaft 20 rotate in reversed directions, thereby changing the mode of the thickness shaft 10 driving the floating shaft to rotate, and there is no need to differentiate a driving shaft and a driven shaft, and avoiding generating of slip.

Figure 2:
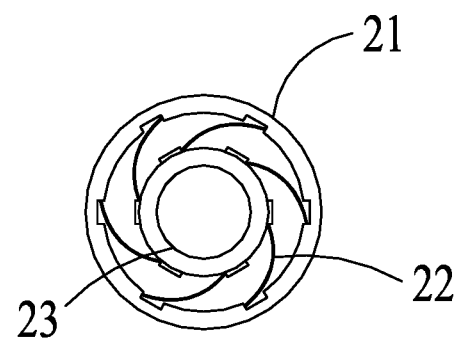
FIG. 2 is a schematic diagram of a radial cross section of a floating shaft in FIG. 1.
Figure 5:
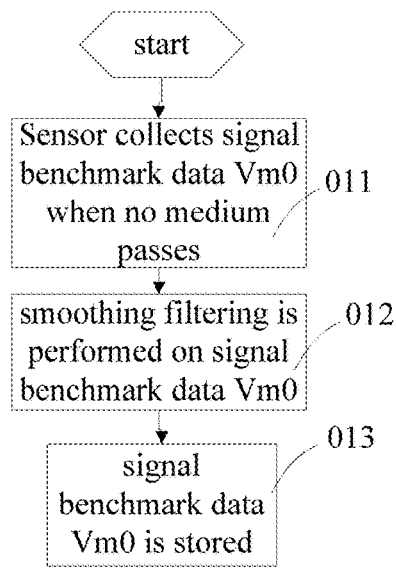
FIG. 5 is a flow chart of calibrating benchmark data.

Preferably, as shown in FIG. 2, the floating shaft includes an axes 23, an elastic material layer 22 and an outer wheel shell layer 21 from the inside to the outside, and the outer surface of the floating shaft 20, actually is the outer surface of the outer wheel shell layer 21, is tangent to the outer surface of the thickness shaft 10. As shown in FIG. 5, as a result of arrangement of the elastic material layer 22, the outer wheel shell layer 21 may move along the direction shown by an arrow when a sheet-like medium 100 enters between the thickness shaft 10 and the floating shaft 20, while may go back to the original place when the sheet-like medium leaves. In the present embodiment, the elastic material layer 22 includes multiple pieces of foil slices, as shown in FIG. 2, specifically the elastic material layer 22 includes 6 pieces of foil slices herein. One end of each elastic foil slice is fixed to the axes 23, the other end is fixed to the inner wall of the outer wheel shell layer 21, and the six elastic slices are uniformly distributed in a vortex shape and have a good elastic characteristic. The floating shaft is able to make the outer wheel shell layer 21 rotate with the axes 23, and the outer wheel shell layer 21 with rich elasticity float up and down with variation of thickness of the sheet-like medium. The elastic material layer 22 may also be other style such as uniformly filled elastic metal wire or other elastic material, which may implement the function of the elastic material layer 22.

A method for identifying thickness of a sheet-like medium of the device for identifying thickness of a sheet-like medium according to the present embodiment is introduced in detail hereinafter.

Figure 4:
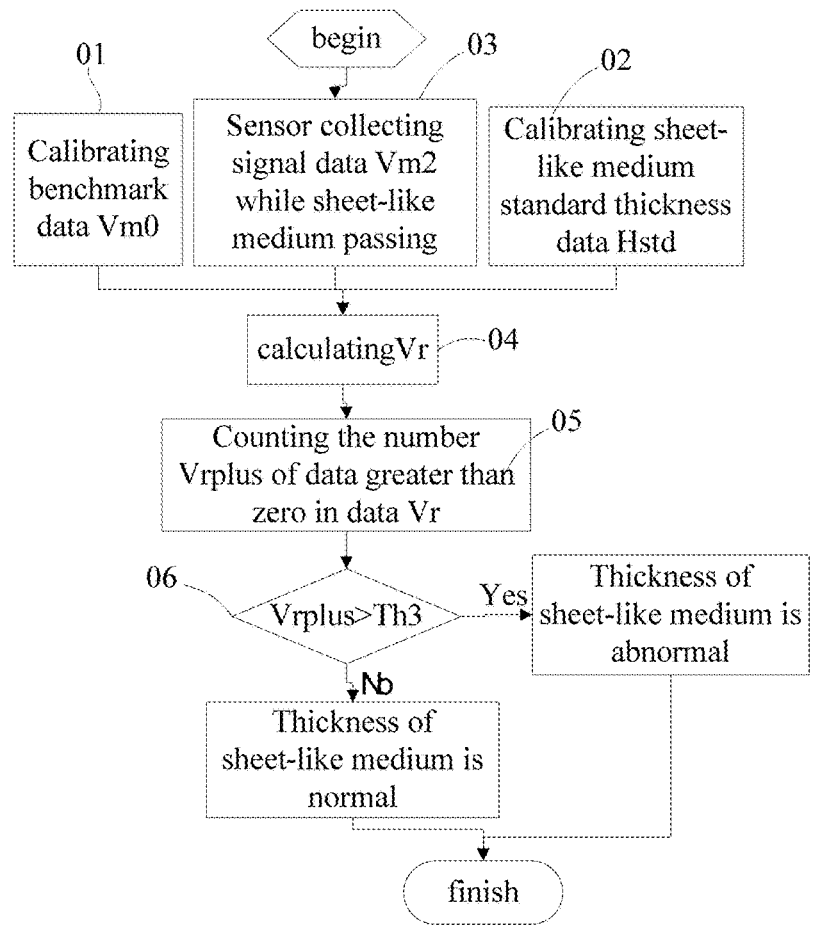
FIG. 4 is an overview flow chart of a method for identifying thickness of a sheet-like medium according to a preferred embodiment of the present application.

As shown in FIG. 4, the overall process of the identification method includes step 01 to step 06. In step 01, benchmark data Vm0 is calibrated. In step 02, standard thickness data Hstd of a sheet-like medium is calibrated. In step 03, signal data Vm2 is collected by a sensor when the sheet-like medium passes. In step 04, Vr is calculated; the signal collected data Vm2 is firstly revised to obtain a revised data Vm2re(t) by reducing the benchmark data Vm0 according to the formula of Vm2re(t)=Vm2(t)−Vm0(t), then Vr(t) is calculated according to the formula of Vr(t)=Vm2re(t)−Hstd+ΔTh2, where ΔTh2 is a threshold value set based on a characteristic of the device. In step 05, the number of data Vrplus which are greater than zero in data Vr is counted. And in step 06, it is determined whether Vrplus is greater than another threshold Th3 set on the basis of device characteristic; the thickness of the sheet-like medium is abnormal if Vrplus is greater than threshold Th3; the thickness of the sheet-like medium is normal if Vrplus is not greater than threshold Th3.

As shown in FIG. 5, the step 01 further includes step 011 to step 013. In step 011, a signal benchmark data Vm0 is collected by the sensor when there is no medium passing. In step 012, smoothing filtering is performed to the signal benchmark data Vm0. And in step 013, the signal benchmark data Vm0 is stored.

Provided that the outer diameter of the floating shaft 20d is U, and the outer diameter of the thickness shaft 10 is A, where U/A=K (K is a constant), which ensures that no offset happening to the point of tangency of the thickness shaft 10 and the floating shaft 20 during rotation, thereby fixing the phase position characteristic of the point of tangency.

Figure 6:
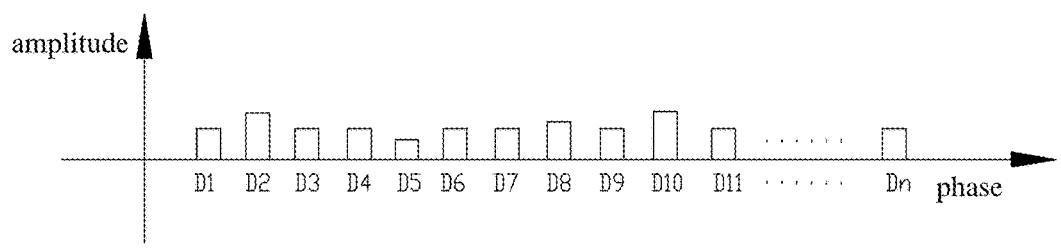
FIG. 6 is a schematic diagram showing phases and amplitudes of points of tangency between a thickness shaft and the floating shaft when there is no sheet-like medium entering.

Provided that points on the thickness shaft are P1, P2, P3, P4 . . . Pn, and points on the circumferential surface of the floating shaft 20 are U1, U2, U3, U4 . . . Un, where Pn is correspondingly tangent with Un, the point of tangency is recorded as Dn. The relationship graph between phase and amplitude each corresponding point output when is shown in FIG. 6 when there is no sheet-like medium entering.

The sensor 30 is able to detect displacement variation of outer wheel shell layer 21 of the floating shaft 20, and the data collected by the sensor 20 are Vm={V1, V2, . . . , Vi, . . . , Vm}, which include data about m channel, and the data about each channel are collected by a single thickness sensor of the sensor 30. The data about a single channel may be represented as Vi(t)={Vi(t1), Vi(t2), . . . , Vi(tj), . . . , Vi(tn)}, 0<i<n. Single channel data are used for making judgment and the thickness is judged to be abnormal when abnormal thickness exists in single channel signal.

Figure 7:
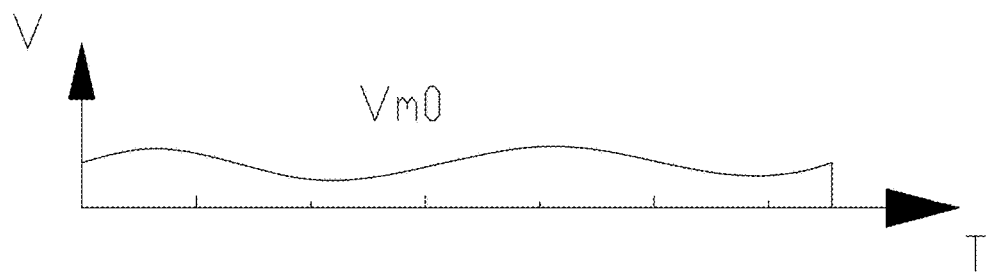
FIG. 7 is a schematic view showing a benchmark amplitude of a single channel signal when there is no sheet-like medium entering.

The signal Vm0 is collected when there is no sheet-like medium passing through the device for identifying thickness of the sheet-like medium. As a result of the synchronous rotation of the floating shaft 20 and thickness shaft 10 of the present device, the collected zero-valued benchmark thickness varies periodically, the collected signal Vm0 may be set as a periodic signal, as shown in FIG. 7. The signal collecting process is controlled by a synchronizer to make sure that the collected signal Vm0 at the beginning of data collection of each piece of sheet-like medium keeps the same with the standard Vm0 when t=0.

Figure 8:
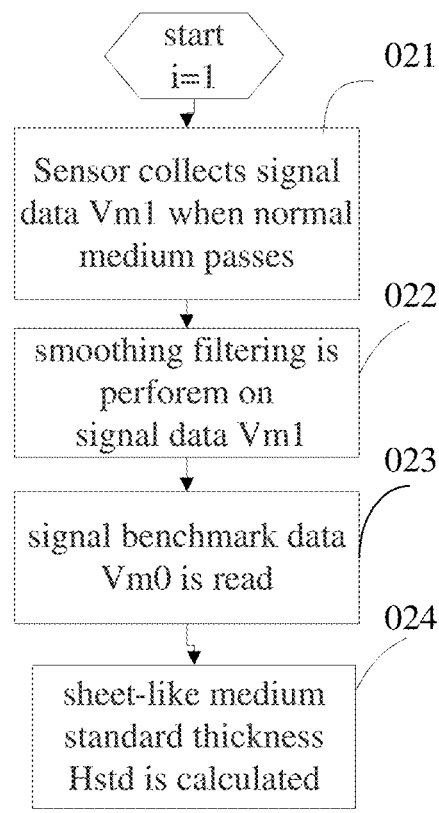
FIG. 8 is a step-by-step flow chart of calibration of standard thickness data of the sheet-like medium.
Figure 9:
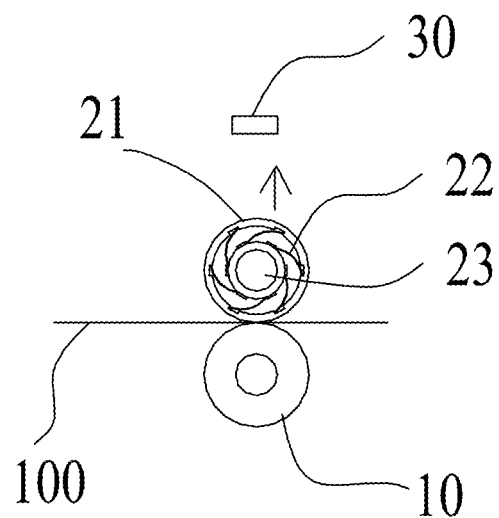
FIG. 9 is a schematic view showing the operation principle when there is no sheet-like medium entering.
Figure 11:
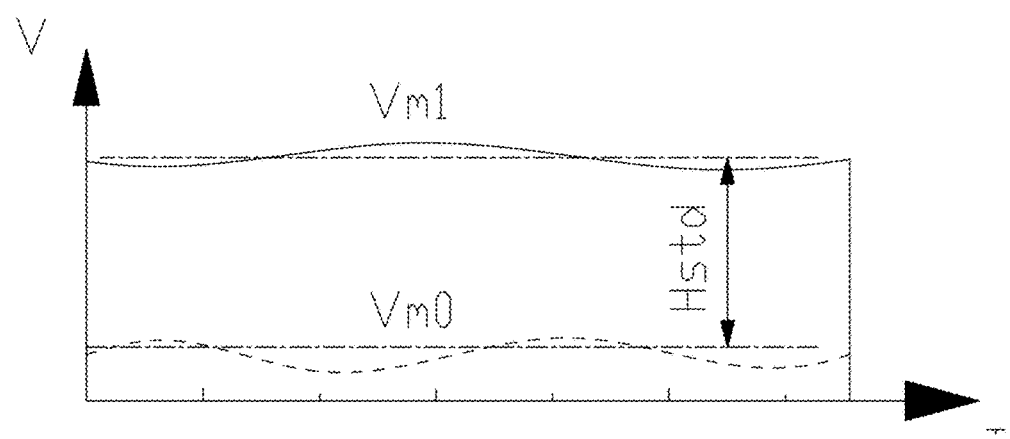
FIG. 11 is a schematic view showing the amplitude of a single channel signal after the normal sheet-like medium enters into the thickness identification device.

In addition, as shown in FIGS. 8 and 11, the step 02 further includes step 021 to step 024. In step 021, a signal data Vm1 is collected when there is a normal medium passes. In step 022, smoothing filtering is performed to the signal date Vm1. In step 023, the signal benchmark data Vm0 is read. In step 024, the standard thickness of the sheet-like medium Hstd is calculated according to the formula of $$Hstd = \sum_{t=0}^{n}(Vm1(t) - Vm0(t))/n,$$

where n is the length of each collected data.

In step 021, the outer wheel shell layer 21 of the floating shaft 20 uplifts in direction shown by the arrow provided that when a piece of sheet-like medium 100 with flat surface and uniform thickness, such as a piece of banknote, enters into the device for identifying its thickness, as shown in FIG.

Figure 10:
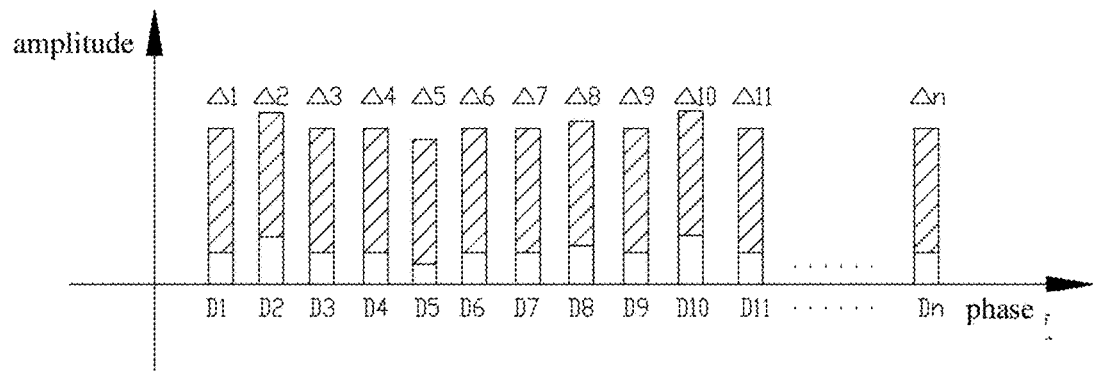
FIG. 10 is a schematic view showing the relationship between phase and amplitude of each point of tangency while the sheet-like medium with uniform thickness entering into the thickness identification device.

9. The sensor 30 can detect amplitude variation Δn (the shaded portion in FIG. 10) of each point due to the entering of the sheet-like medium. The amplitudes of points of tangency increase therewith, however the variations of amplitudes keep constant, that is $\Delta 1 = \Delta 2 = \Delta 3 = \ldots \Delta n$, as shown in FIG. 10.

Figure 12:
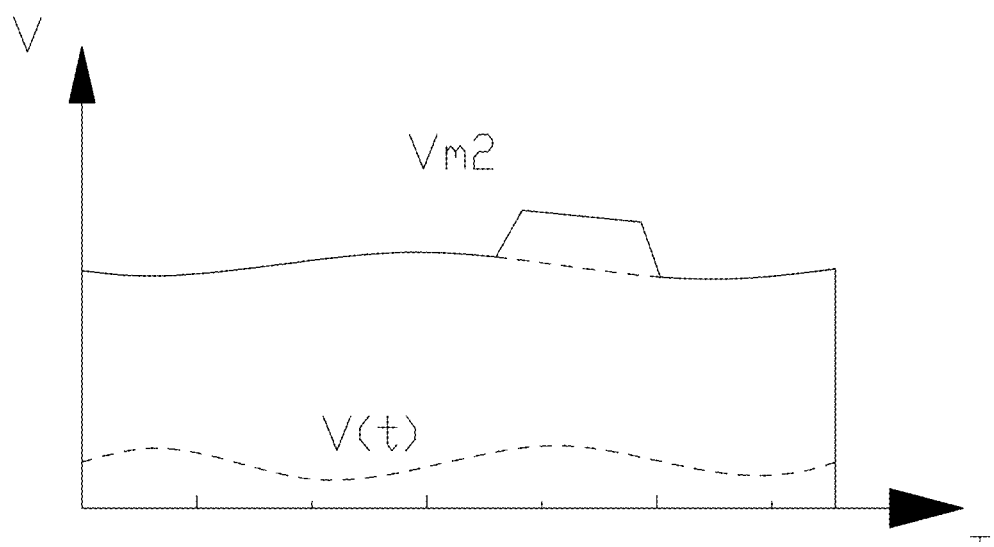
FIG. 12 is a schematic view showing the amplitude of a single channel signal after the abnormal sheet-like medium enters into the thickness identification device.

Data Vm2 is collected when the sheet-like medium passes, as shown in FIG. 12, and then the data Vm2 is revised to obtain revised data Vm2re(t) by deducting the zero value benchmark data Vm0 according to the formula of Vm2re(t)=Vm2(t)−Vm0(t), then Vr(t) is calculated according to the formula of Vr(t)=Vm2re(t)−Hstd+ΔTh2, where ΔTh2 is a threshold value set based on the characteristic of the device and is a maximum permissible limit of error generated by signal noise. At last, data Vr is searched, the number of data Vrplus which is greater than zero in the data Vr is counted, and then it is judged whether the Vrplus is greater than Th3, the thickness of the sheet-like medium is abnormal if the Vrplus is greater than Th3, the thickness of the sheet-like medium is normal if the Vrplus is not greater than Th3, where Th3 is a threshold value set based on the characteristics of the device and is a maximum permissible limit of error of the calculated Vr. As shown in FIG. 12, the amplitude of a signal about a single channel when the sheet-like medium passes reveals that thickness of the sheet-like medium is abnormal.

The thickness shaft and floating shaft of the device for identifying thickness of a sheet-like medium according to the present disclosure are simultaneously driven by a driving motor, which effectively prevents slip between the thickness shaft and the floating shaft, thereby mechanical wear is reduced and accuracy of thickness detection is improved. In addition, a special conjunction manner between the elastic material layer and the outer wheel shell layer is adopted in the floating shaft, which make the outer wheel shell layer may rotate around the axes and to ensure that the outer wheel shell layer with high elasticity may float up and down with variation of thickness of the sheet-like media. That is to say, when a sheet-like medium enters or exits, the thickness of the sheet-like medium may be detected by only the displacement of the outer wheel shell layer, rather than the displacement of the whole shaft, and error may be reduced.

What described above are just the preferred embodiments and are not to be construed as limiting the disclosure, the scope of which is defined by the appended claims. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A device for identifying thickness of a sheet-like medium, comprising
    a frame, comprising two lateral plates and a facade, configured to carry a thickness shaft, a floating shaft and a sensor; wherein:
    both ends of the thickness shaft are arranged on the two lateral plates of the frame via bearings;
    both ends of the floating shaft are arranged on the two lateral plates of the frame via bearings and an outer surface of the floating shaft is tangently contacted with an outer surface of the thickness shaft; and
    the sensor is arranged on the façade of the frame, and configured to detect an amplitude of a point of tangency where the floating shaft is tangent to the thickness shaft;
    wherein one end of the thickness shaft is fixedly connected with a first synchronous pulley, the first synchronous pulley is connected with a first synchronous pulley gear via a first synchronous belt; one end of the floating shaft is fixedly connected with a second synchronous pulley, the second synchronous pulley is connected with a second synchronous pulley gear via a second synchronous belt; the first synchronous pulley gear meshes with the second synchronous pulley gear and is assembled on a shaft of a driving motor.

2. The device for identifying thickness of a sheet-like medium according to claim 1, wherein the first synchronous pulley gear comprises a synchronous pulley part and a gear part, and the first synchronous belt sleeves on the first synchronous pulley and the synchronous pulley part of the first synchronous pulley gear.

3. The device for identifying thickness of a sheet-like medium according claim 2, wherein the second synchronous pulley gear comprises a synchronous pulley part and a gear part, the second synchronous belt sleeves on the second synchronous pulley and the synchronous pulley part of the second synchronous pulley gear, and the gear part of the second synchronous pulley gear meshes with the gear part of the first synchronous pulley gear.

4. The device for identifying thickness of a sheet-like medium according to claim 3, wherein the second synchronous pulley gear sleeves on a bearing, the bearing sleeves on a shaft which riveted with the lateral plate of the frame, and the second synchronous pulley gear is rotatable with the shaft.

5. The device for identifying thickness of a sheet-like medium according to claim 4, wherein the floating shaft comprises an axis, an elastic material layer and an outer wheel shell layer from the inside to the outside, and the outer surface of the outer wheel shell layer is tangent to the outer surface of the thickness shaft.

6. The device for identifying thickness of a sheet-like medium according to claim 2, wherein the floating shaft comprises an axis, an elastic material layer and an outer wheel shell layer from the inside to the outside, and the outer surface of the outer wheel shell layer is tangent to the outer surface of the thickness shaft.

7. The device for identifying thickness of a sheet-like medium according to claim 3, wherein the floating shaft comprises an axis, an elastic material layer and an outer wheel shell layer from the inside to the outside, and the outer surface of the outer wheel shell layer is tangent to the outer surface of the thickness shaft.

8. The device for identifying thickness of a sheet-like medium according to claim 1, wherein one end of the thickness shaft and the first synchronous pulley gear are fixed via a D-shape structure, and one end of the floating shaft and the second synchronous pulley gear are fixed via a D-shape structure.

9. The device for identifying thickness of a sheet-like medium according to claim 8, wherein the floating shaft comprises an axis, an elastic material layer and an outer wheel shell layer from the inside to the outside, and the outer surface of the outer wheel shell layer is tangent to the outer surface of the thickness shaft.

10. The device for identifying thickness of a sheet-like medium according to claim 1, wherein the floating shaft comprises an axis, an elastic material layer and an outer wheel shell layer from the inside to the outside, and the outer surface of the outer wheel shell layer is tangent to the outer surface of the thickness shaft.

11. The device for identifying thickness of a sheet-like medium according to claim 10, wherein the elastic material layer comprises at least three foil slices, one end of each elastic foil slice is fixed to the axis, the other end is fixed to the inner wall of the outer wheel shell layer, and the three elastic foil slices are distributed in a vortex shape.

\* \* \* \* \*